Feb. 13, 1923.　　　　　　　　A. R. HAMMOND ET AL.　　　　　　　1,445,079.
MOTOR REPAIR STAND.
FILED FEB. 28, 1920.
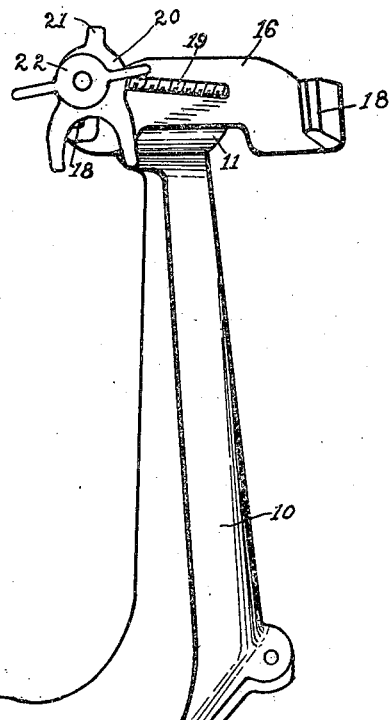
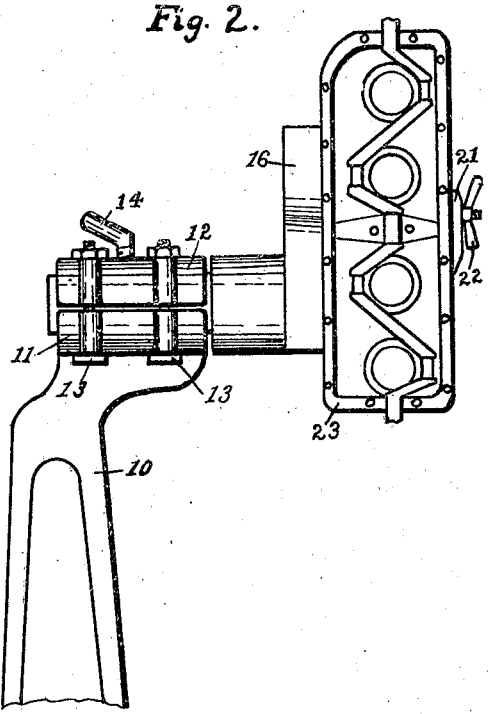
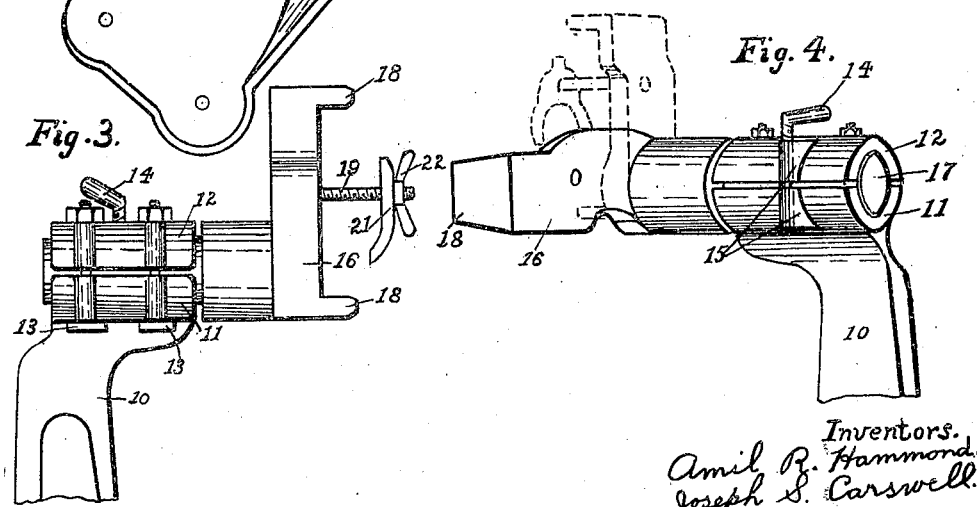

Patented Feb. 13, 1923.

1,445,079

UNITED STATES PATENT OFFICE.

AMIL R. HAMMOND AND JOSEPH S. CARSWELL, OF BOONE, IOWA.

MOTOR-REPAIR STAND.

Application filed February 28, 1920. Serial No. 361,979.

*To all whom it may concern:*

Be it known that we, AMIL R. HAMMOND and JOSEPH S. CARSWELL, citizens of the United States, and residents of Boone, in the county of Boone and State of Iowa, have invented a certain new and useful Motor-Repair Stand, of which the following is a specification.

The object of our invention is to provide a motor repair stand of simple, durable and inexpensive construction, especially designed for use in automobile repair shops and for the purpose of holding an automobile engine in position where the operator may conveniently and easily take down, assemble or repair various parts thereof without removing or readjusting the motor relative to the stand.

More specifically it is our object to provide a motor stand of this character so arranged and constructed that the operator may readily and easily place an entire engine motor in position on the stand, and there firmly clamp and secure it, and then the motor may be moved about in any position required for promoting the convenience or facility of the operator in taking down or reassembling any of its parts, without affecting the clamped relation of the motor to the stand, and thereby avoiding all possibility of dropping the motor or injuring its parts when being turned around to render more accessible any of the detachable or replaceable parts thereof.

Our invention consists in the construction, arrangement and combination of the various parts of the device, whereby the objects contemplated are attained, as hereinafter more fully set forth, pointed out in our claim, and illustrated in the accompanying drawings, in which:

Figure 1 shows a perspective view of a motor repair stand embodying our invention.

Figure 2 shows a side elevation of the upper part of a motor repair stand embodying our invention, with an engine block clamped thereto.

Figure 3 shows a view similar to Figure 2, with the engine block removed; and

Figure 4 shows a detail perspective view illustrating the swivel bench and the swivel clamp, the dotted lines showing the swivel bench in a vertical position to illustrate its adjustability.

Referring to the accompanying drawings, we have used the reference numeral 10 to indicate the standard or base designed to rest upon the floor, and of a height sufficient to hold an engine block in position where an operator can conveniently work on it.

At the top of the standard is a swivel clamp, the lower member of which is semi-cylindrical in shape and is indicated by the numeral 11. The upper half of the swivel clamp 12 is also semi-cylindrical, and is secured to the lower half on one side by means of two bolts 13, and on the other side by a clamping bolt 14 having a handle thereon and seated in screw-threaded lugs 15 in the clamping members 11 and 12.

The swivel bench comprises a body portion 16 having formed integral with one end portion thereof a cylindrical extension 17 designed to enter the swivel clamp. In connection with the arrangement just described, it should be explained that the swivel bench is rotatably mounted in the swivel clamp, and that by manipulation of the handle on the bolt 14 the said swivel bench may be clamped and firmly held in any position of its adjustment.

At the ends of the swivel bench are preferably formed two lugs 18, designed to engage the sides of an engine block and to project to a slight extent between two of the cylinders thereof.

At the central portion of the swivel bench is a screw-threaded rod 19, having loosely mounted on its outer end a clamping plate 20. This clamping plate is preferably formed with three fingers 21, extended in diverse directions and designed to engage the side of the engine block opposite from the body portion 16 of the swivel bench, the screw-threaded rod 19 being designed to pass through the engine block between the central cylinders thereof. On the outer end of the rod 19 is a wing nut 22.

In Figure 2 we have illustrated a part of an engine block held in position on the swivel bench. This engine block is indicated by the numeral 23, and is of ordinary construction, illustrated simply for the purpose of showing the manner in which an engine block may be supported and held in our improved motor repair stand.

In practical use, it should be remembered that an ordinary automobile motor is too heavy to be conveniently removed from the automobile and placed in a stand by workmen, and when thus handled it is likely to fall and be broken or injured. It is, therefore, desirable to provide a motor block so arranged that it may be removed entirely from a car before being taken down or disassembled, and this is usually done with a block and tackle device. With our improved motor block stand the entire engine, before being disassembled, can be firmly and securely clamped to our improved motor block stand, and this is done by swinging it to position where the rod 19 will pass through it between the central cylinders, and the clamping plate 20 may then be applied and the wing nut 22 tightened up until the motor is firmly clamped between the clamping plate 20 and the swivel bench 16, with the lugs 18 projecting part way between the two outer pairs of cylinders. With our improved motor repair stand this clamping may be done when the motor is supported in a block and tackle in almost any position, because the swivel bench may be moved through a complete circle to adapt itself to the position which the motor assumes when being thus supported on a block and tackle.

After the motor has once been secured in position, it is never necessary, with our improved motor repair stand, to change its position relative to the motor repair stand, because every detachable part of the motor can be made accessible conveniently and easily to the operator by simply swinging the swivel bench to various positions.

In motor block stands heretofore used it has been customary to wholly or partly disassemble the motor before clamping it to the motor block stand, or else it has been necessary to do part of the work of disassembling, assembling or repairing while the motor was in one position relative to the stand, and then other parts of the work after the motor had been readjusted on the stand. But with our improvement this is never necessary, because the only parts which are engaged or covered up by the clamping parts are the outer surfaces of the cylinders, and no detachable or adjustable parts are ever covered up, or their removal or replacement interfered with, by our improved motor stand.

We claim as our invention:

An improved motor repair stand comprising in combination a standard, a split bearing at the upper part of the standard, means for adjusting the parts of the split bearing relative to each other, a bench having a journal at one end thereof designed to enter said split bearing whereby the said journal may be freely rotated throughout a complete circle or clamped in any position of its movement, a screw threaded rod extended from the central portion of the swiveled bench in a direction opposite from said journal, and an engine clamping plate on said screw threaded rod, for the purpose as stated.

Des Moines, Iowa, January 29, 1920.

AMIL R. HAMMOND.
JOSEPH S. CARSWELL.